(12) United States Patent
Takagi

(10) Patent No.: US 7,193,585 B2
(45) Date of Patent: Mar. 20, 2007

(54) IMAGE OBSERVATION SYSTEM

(75) Inventor: Akinari Takagi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 588 days.

(21) Appl. No.: 10/722,444

(22) Filed: Nov. 28, 2003

(65) Prior Publication Data
US 2004/0140949 A1 Jul. 22, 2004

(30) Foreign Application Priority Data
Nov. 29, 2002 (JP) ............................. 2002-347914

(51) Int. Cl.
*G09G 5/00* (2006.01)

(52) U.S. Cl. .................. 345/8; 345/9; 345/55; 345/76; 348/47; 348/52

(58) Field of Classification Search .................. 345/8, 345/9, 55, 76; 348/47, 52
See application file for complete search history.

(56) References Cited

U.S. PATENT DOCUMENTS

| | | | |
|---|---|---|---|
| 5,844,670 A * | 12/1998 | Morita et al. ............... | 365/124 |
| 5,880,883 A * | 3/1999 | Sudo ........................... | 359/462 |
| 6,507,359 B1 * | 1/2003 | Muramoto et al. ........... | 348/47 |
| 6,671,103 B2 * | 12/2003 | Itoh ............................. | 359/689 |

FOREIGN PATENT DOCUMENTS

| | | |
|---|---|---|
| EP | 0 206 324 A2 | 6/1986 |
| EP | 0 830 034 A1 | 3/1998 |
| EP | 1 098 217 A1 | 5/2001 |
| JP | 3205552 B2 | 6/2001 |
| JP | 2001-249302 A | 9/2001 |
| WO | WO 96/36271 | 11/1996 |

OTHER PUBLICATIONS

Patent Abstracts of Japan, vol. 2000, No. 26, Jul. 1, 2002, JP 2001 249302 A.

* cited by examiner

*Primary Examiner*—Richard Hjerpe
*Assistant Examiner*—Leonid Shapiro
(74) *Attorney, Agent, or Firm*—Fitzpatrick, Cella, Harper & Scinto

(57) ABSTRACT

An image observation system includes a pair of image observation devices each having i) an image pickup device, ii) an image pickup optical system for directing light rays from an outside world to the image pickup device, iii) a display device for displaying an outside world image obtained by the image pickup system, and iv) a display optical system for directing light from the display device to an observing eye. The optical axis of the image pickup system and the optical axis of the display system are disposed coaxially, wherein the optical axes of the image pickup systems of the pair of image observation devices define a point of intersection, and wherein a focal plane being at a position conjugate with a surface of the image pickup device with respect to the image pickup optical system is disposed at a side of the intersection point of the optical axes of the image pickup systems, which side faces an observer.

26 Claims, 12 Drawing Sheets

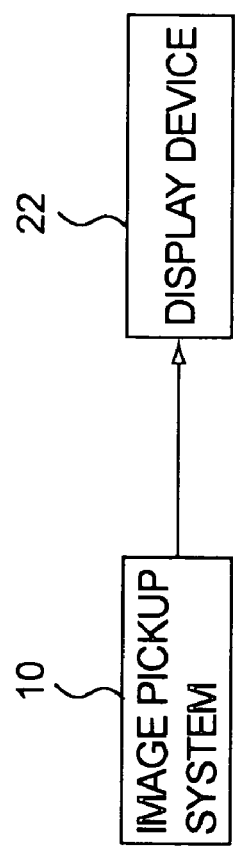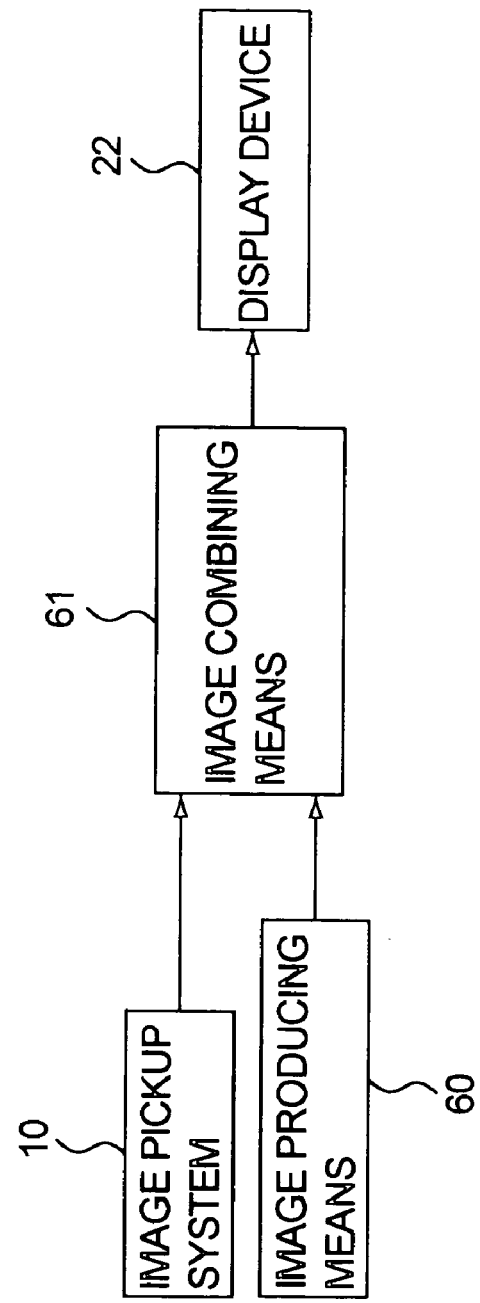

IMAGE OBSERVATION SYSTEM

FIELD OF THE INVENTION AND RELATED ART

This invention relates to an image observation device arranged so that an outside world view (outside world image or outside world information) obtained by use of an image pickup optical system (image pickup system) is displayed on a display device (image display means), thereby to enable observation. In another aspect, the invention concerns an image observation system arranged so that an image (virtual image) artificially created by use of a computer or the like or a video image recorded by a video camera or the like is superposed on a real view (outside world information), to enable various simulated experiences, for example.

Conventionally, head-mount type image observation systems, called HMD (Head Mounted Display), are known in which a CRT or LCD is used and a display plane is enlarged by and can be observed through an image observation optical system.

Also, image observation systems using such HMD are known, in which a pair of image pickup systems and a pair of display systems are provided for left and right eyes of an observer, and an outside world image (outside world information) is converted by an image pickup device such as a CCD camera or the like into electric signals and then it is displayed on a display device such as a CRT or LCD. The outside world image can be observed three-dimensionally through a display optical system, utilizing binocular parallax. Hereinafter, this type of observation will be referred to as "video see-through observation". Thus, the outside world can be observed as if by naked eyes.

Further, image observation systems have been proposed in which an outside world image taken by a camera is combined with an image created by computer graphics or with a video image recorded by a video camera or the like, to enable observation of a composite of a real space and a virtual space. Also, complex or mixed reality (MR) systems based on such image observation systems have been proposed.

In regard to such video see-through type image observation systems as described above, for registration of the position of the object being observed, between the observation through naked eyes and the observation through an image observation device, an observation system called a parallax-less video see-through image observation system has been proposed (e.g. Japanese Laid-Open Patent Application No. 2001-249302), in which system the outside-world side optical axis of an image pickup optical system of an image pickup system and the eye-ball side optical axis of a display optical system are registered with each.

Further, although an image pickup system used is not a head mount type, an image observation system has been proposed in which, as disclosed in Japanese Patent No. 3205552, the structure of an image pickup system for taking an image to be displayed on an HMD is arranged so that the distance between a display system vergence point of the HMD and a virtual image plane of a display device defined by the display system and the distance between an image pickup system vergence point and a conjugate plane (focus plane) of an image pickup device defined by an image pickup optical system are made equal to each other.

In the parallax-less video see-through type HMD in which the outside-world side optical axis of an image pickup optical system of an image pickup system and an eye-ball side optical axis of a display optical system are registered with each other, as the object of observation becomes close to the observer, the parallax-less effect becomes larger. Particularly, where the object of observation is in a short range such as not longer than 1 m, a notable parallax-less effect is obtainable, as compared with a case wherein parallax is produced because of the difference between the image pickup system optical axis and the display system optical axis.

In regard to the mixed reality (MR) systems using video see-through HMD, there are many MR applications in which the interactiveness to the reality space and the virtual space is much regarded and in which the region inside the range of the observer's reach (1 m or less) is mainly concerned. As regards the image observation device to be used with such applications, use of the parallax-less type video see-through HMD described above, having low parallax even for short-range observation, is the best.

SUMMARY OF THE INVENTION

In conventionally proposed image observation systems, the focus plane of an image pickup system and a plane containing the image pickup system vergence point are registered with each other, following the relationship between the vergence point position and the focus position in the naked-eye observation. Where such image observation system is applied to an MR application, in which the aforementioned interactiveness is regarded, to perform observation for a short-range space, all the focus of the image pickup system, the vergence point and the virtual image position of the display system must be set at a near distance such as 60 cm, for example. If this state is accomplished, a clear image can be provided to the observer even in the observation for the short-range space.

On the other hand, where the vergence point of the display system is set at a near distance, there arises a problem that the orientation of the eye balls is always directed to the near point and, also, since the vergence angle becomes large, in a slightly far range (for example, 1 m or more), the visual fields of the left and right eyes can not be registered with each other, such that visual field conflict occurs. This applies a heavy burden to the observer's eyes. In consideration of it, to reduce the burden to the observer's eyes, the focus of the image pickup system, the vergence point, and the virtual image position of the display system are set typically at about 2 m from the observer, to enable natural observation for a relatively wide range.

However, as a consequence of the above, if the observation system is applied to an MR application in which the interactiveness is regarded, no focal point of the image pickup system is defined in the short-range region grazed by the observer. Therefore, there still remains the problem that clear observation is difficult to accomplish. Thus, the advantages of the parallax-less type image observation system, having low parallax even for short range, are unavailable.

It is accordingly an object of the present invention to provide an image observation system for taking an image of a reality space of an outside world and reproducing the same, by which the reality space can be reproduced without distortion even if an object of observation placed close to an observer is observed, and by which a clear image can be provided to the observer, such that the reality space can be reproduced more naturally.

In order to achieve the above-described object, in accordance with a first aspect of the present invention, there is provided an image observation system, comprising: a pair of image observation devices each having i) an image pickup device, ii) an image pickup optical system for directing light rays from an outside world to said image pickup device, iii) a display device for displaying an outside world image obtained by said image pickup system, and iv) a display optical system for directing light from said display device to an observing eye, wherein, where an axis containing a center of an entrance pupil of said image pickup optical system and a point being conjugate with a center of said image pickup device with respect to said image pickup optical system is taken as an optical axis of an image pickup system while an axis containing a center of an exit pupil of said display optical system and & point being conjugate with a center of said display device with respect to said display optical system is taken as an optical axis of a display system, the optical axis of the image pickup system and the optical axis of the display system optical axis are disposed coaxially, wherein the optical axes of the image pickup systems of the pair of image observation devices define a point of intersection, and wherein a focal plane being at a position conjugate with a surface of said image pickup device with respect to said image pickup optical system is disposed at a side of the intersection point of the optical axes of the image pickup systems, which side faces an observer.

With this arrangement, even if an object of observation placed close to an observer is observed, the reality space can be reproduced without distortion and, additionally, a clear image can be provided to the observer. Thus, an image observation system which reproduces a reality space more naturally, can be accomplished.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 13A and 13B are diagrammatic views, respectively, for explaining examples of a display content to be displayed with an image observation system according to the present invention.

DESCRIPTION OF THE PREFERRED EMBODIMENTS

Preferred embodiments of the present invention will now be described with reference to the attached drawings.

Figure 1:
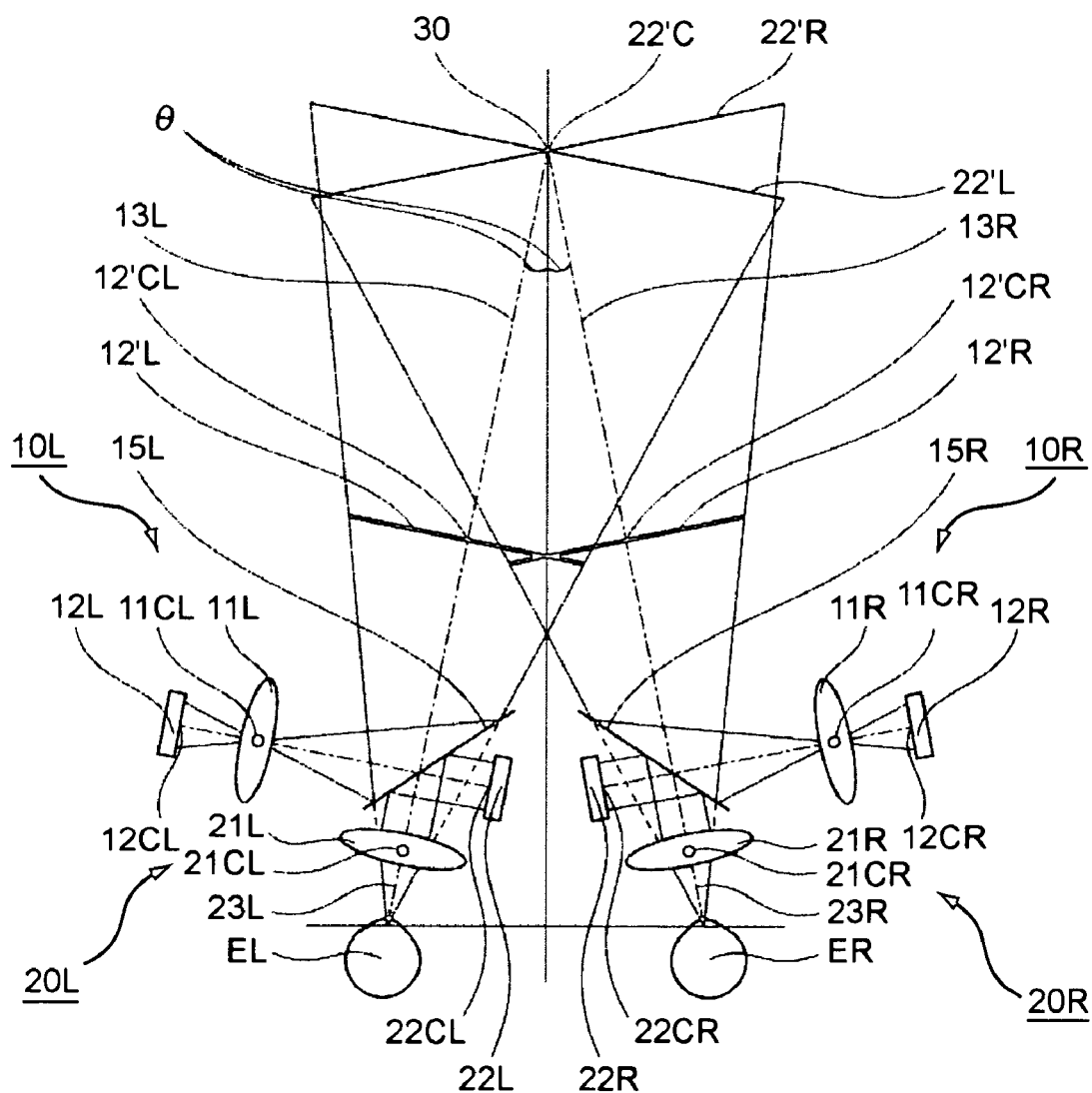
FIG. 1 is schematic view for explaining the structure of an image observation system according to the present invention.

FIG. 1 is a schematic view for explaining the structure of an image observation system according to the present invention. The image observation system of the present invention is provided with a pair of image observation devices for left and right eyes of an observer, each comprising a display system 10 and an image pickup system 20. In the drawing, those elements for the right-side eye are denoted with subscript "R", and those elements for the left-side eye are denoted with subscript "L". The characters "E" denote the observing eyes.

In FIG. 1, the image pickup system comprises an image pickup optical system 11 and an image pickup device 12. The image pickup system optical axis 13 is a straight line that contains the center 11C of the entrance pupil of the image pickup optical system and a point 12'C being conjugate with the center 12C of the image pickup device. The position and the focal length, etc., of the image pickup optical system 11 are determined so that the focal plane 12' of the image pickup system 10, which is a plane being conjugate with the surface of the image pickup device 12, is defined at a side of a reference position 30 (to be described later), which side faces the observer. The distance between the observer and the focal plane 12' can be determined appropriately in accordance with the use of the image observation system.

In FIG. 1, the display system 20 comprises a display optical system 21 and a display device 22. The display system optical axis 23 is a straight line that contains the center 21C of the exit pupil of the display optical system and a point 22'C being conjugate with the center 22C of the display device. The position and the focal length, etc., of the display optical system 21 are determined so that an enlarged virtual image of the display content of the display device 22 is produced at the reference position 30 to be described later.

As shown in FIG. 1, the image pickup system optical axis 13 and the display system optical axis 23 are disposed coaxially so that registration of the position of the object observed, for example, is assured between the observation through naked eyes and the observation through the image observation device. There is a mirror 15 for bending the image pickup system optical axis 13 and the display system optical axis 23 to separate the light paths of the image pickup system 10 and the display system 20 from each other.

The center 12C of the image pickup device is disposed on the optical axis of the image pickup optical system, and the center 22C of the display device is disposed on the optical axis of the display optical system. The image observation system is arranged so that the whole structure of each of the image observation devices for the left and right eyes, respectively, including the image pickup system and the display system such as described above, is tilted by an angle θ, by which the optical axes 13L and 13R of the left-eye and right-eye image pickup systems and the optical axes 23L and 23R of the left-eye and right-eye display systems are tilted by an angle θ. As a result, these optical axes intersect with each other at the reference position 30 defined at the outside-world side. The reference position 30 is set at 2 m ahead, for example, from the observer.

Each display optical system 21 for the left and right eyes is set so that the virtual image screen which is at a plane 22' being conjugate with the display device 22 with respect to the display optical system 21 is registered with a plane that contains the reference position 30. As a result, the light from the display device 22 is directed by the display optical system 21 to the observing eye E. Thus, the display content of the display device 22 can be recognized by the observer as a virtual image upon the plane that contains the reference position 30.

On the other hand, the image pickup optical system 11 is set so that the focal plane which is the plane 12' being conjugate with the image pickup device 12 with respect to the image pickup optical system 11, is defined at an observer side position of the reference position 30. The light rays from the object whose image is to be taken are directed by the mirror 15 and the image pickup optical system 11 to the image pickup device 12, whereby the image is taken.

Figure 2:
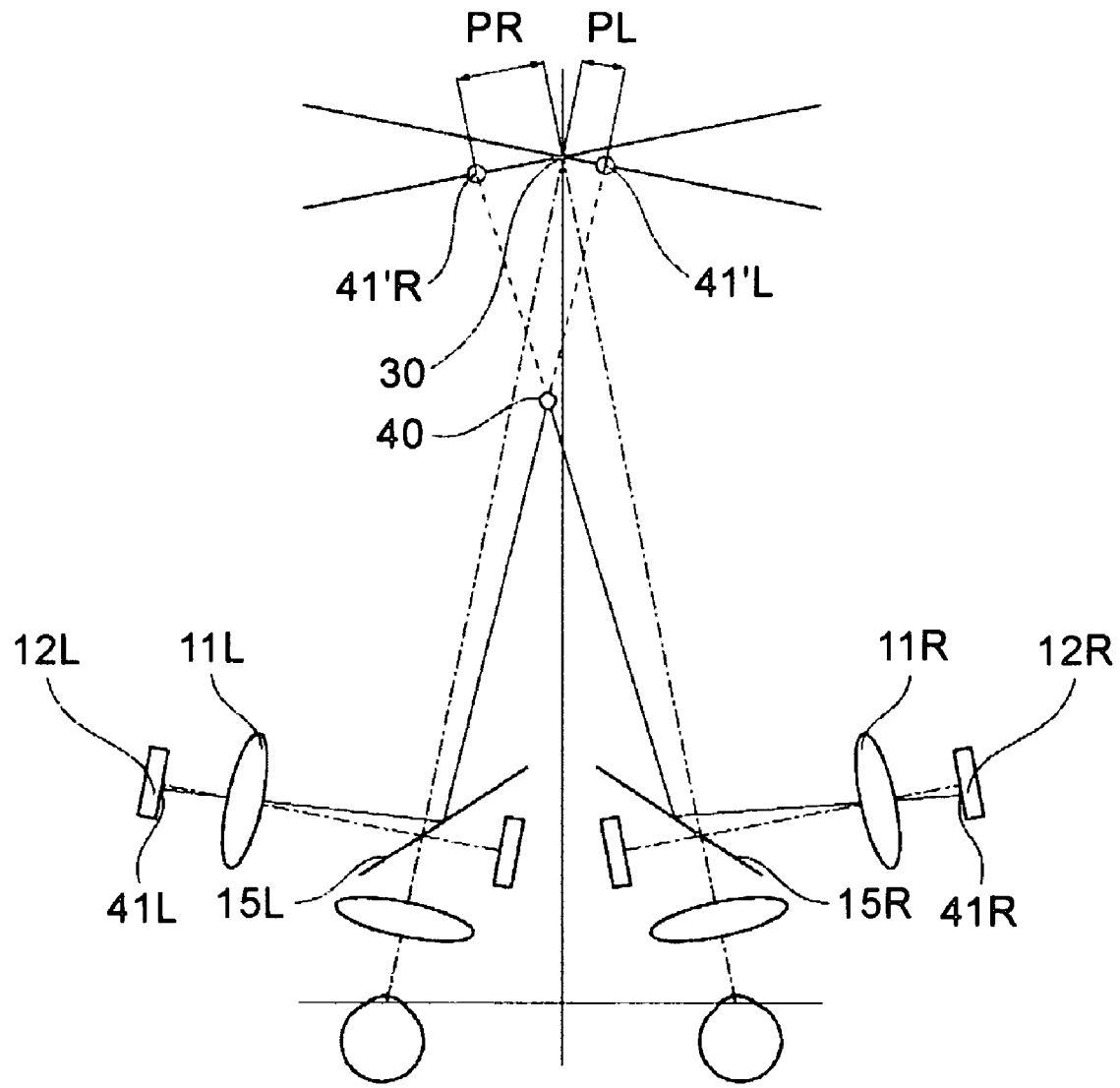
FIG. 2 is a schematic view for explaining a case wherein, in FIG. 1, an image of an object which is at a side of a reference position, facing an observer, is to be taken.
Figure 3:
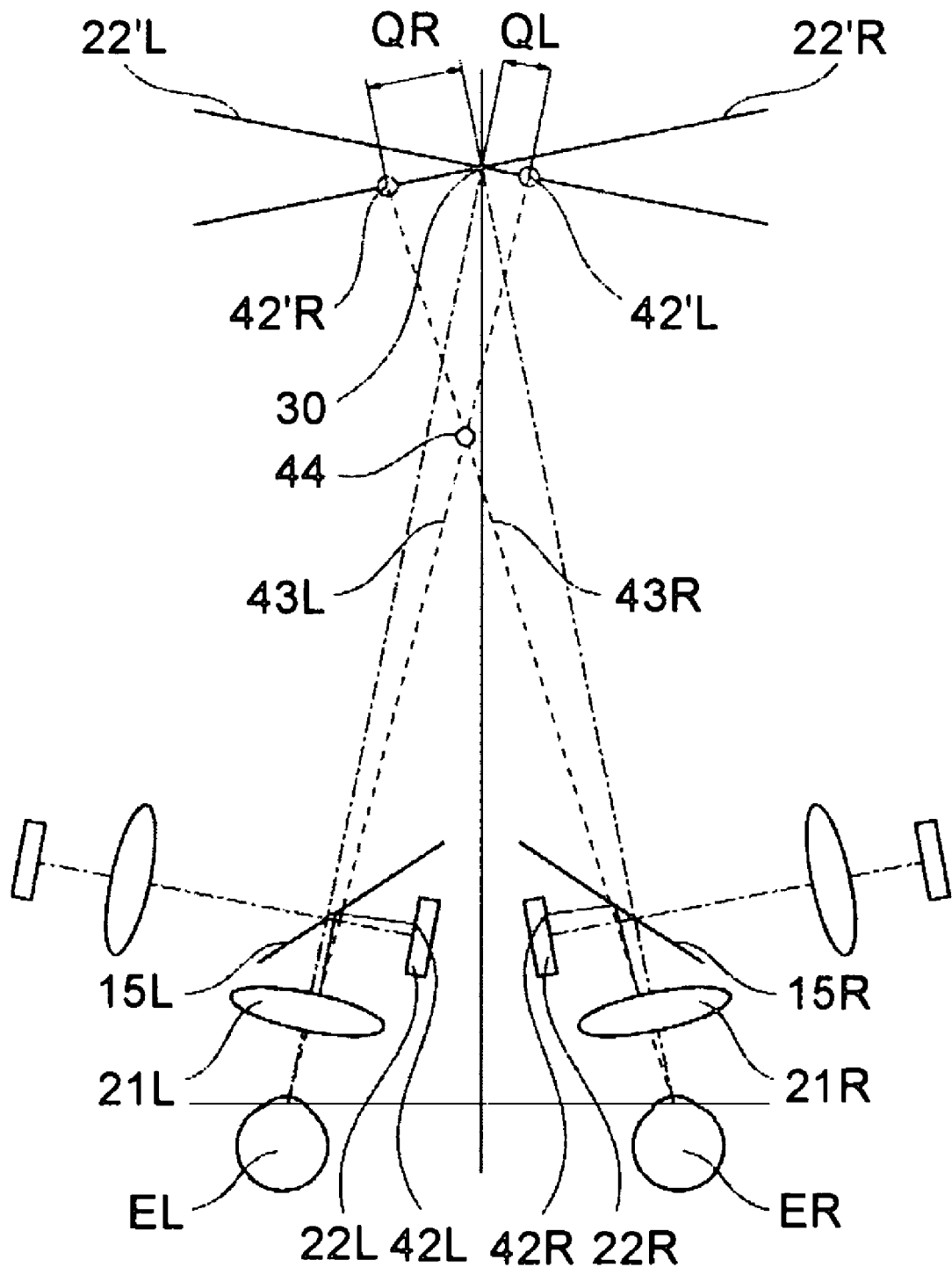
FIG. 3 is a schematic view for explaining a case wherein, in FIG. 1, an object which is at a side of the reference position, facing the observer, is to be displayed to the observer.

FIGS. 2 and 3 are schematic views, respectively, for explaining a case wherein an image of an object 40 in the outside-world space, being present at the observer side of the reference position, is to be taken and a case wherein that image is to be displayed to the observer.

In FIG. 2, the object 40 in the outside-world space is imaged as an image 41 upon the image pickup device 12, by means of the mirror 15 and the image pickup optical system 11. Here, irrespective of that the object 40 is at the observer side of the reference position 30, since the focal plane 12' of the image pickup system 10 is set at the observer side of the reference position 30 as described hereinbefore, the image 40 produced on the image pickup device 12 can be made sharp. Also, upon the plane containing the reference position 30, the image 41 corresponds to an image 41', and the image 41' is positioned at a distance P from the reference position.

In FIG. 3, the object 40 imaged by the image pickup device 10 is displayed on the display device 22 as an image 42. The image 42 can be observed by the observing eye E as an image 42' upon a virtual image screen 22' being conjugate with the display device 22. The image 42' can be observed at a position spaced by Q from the virtual image screen center (i.e. reference position) 30.

The observer observes the image 42'R with his/her right eye ER and observes the image 42'L with his/her left eye EL. Thus, the observer can observe as if the object 40 is present at the intersection point 44 between the line of sight 43R of the right eye ER and the line of sight 43L of the left eye EL. Here, if the image-pickup view angle and the display view-angle are equal to each other, the distances P and Q become equal to each other, such that the position of the intersection point 44 coincides with the actual position of the object 40 in the outside-world space. Also, the size of the object reproduced is the same as that of the object 40.

It has been confirmed experimentally that, in a virtual-image presentation type image observation system such as described above, if the focal plane 12' of the image pickup system 10 is set at the observer side of the reference position 30 where the vergence point and the virtual image screen are defined, the position of the vergence point defined by the line of sight of the observer is not fixed to the virtual image screen position but registered with the vergence point in the naked-eye observation.

Therefore, with the structure described above, the space can be reproduced while distortion of the observed space produced when the vergence point of the image observation system is made close to the observer, can be suppressed, and a clear image can be provided even in a short-range region (the region to be observed frequently), without a burden to the observer's eyes.

Figure 4:
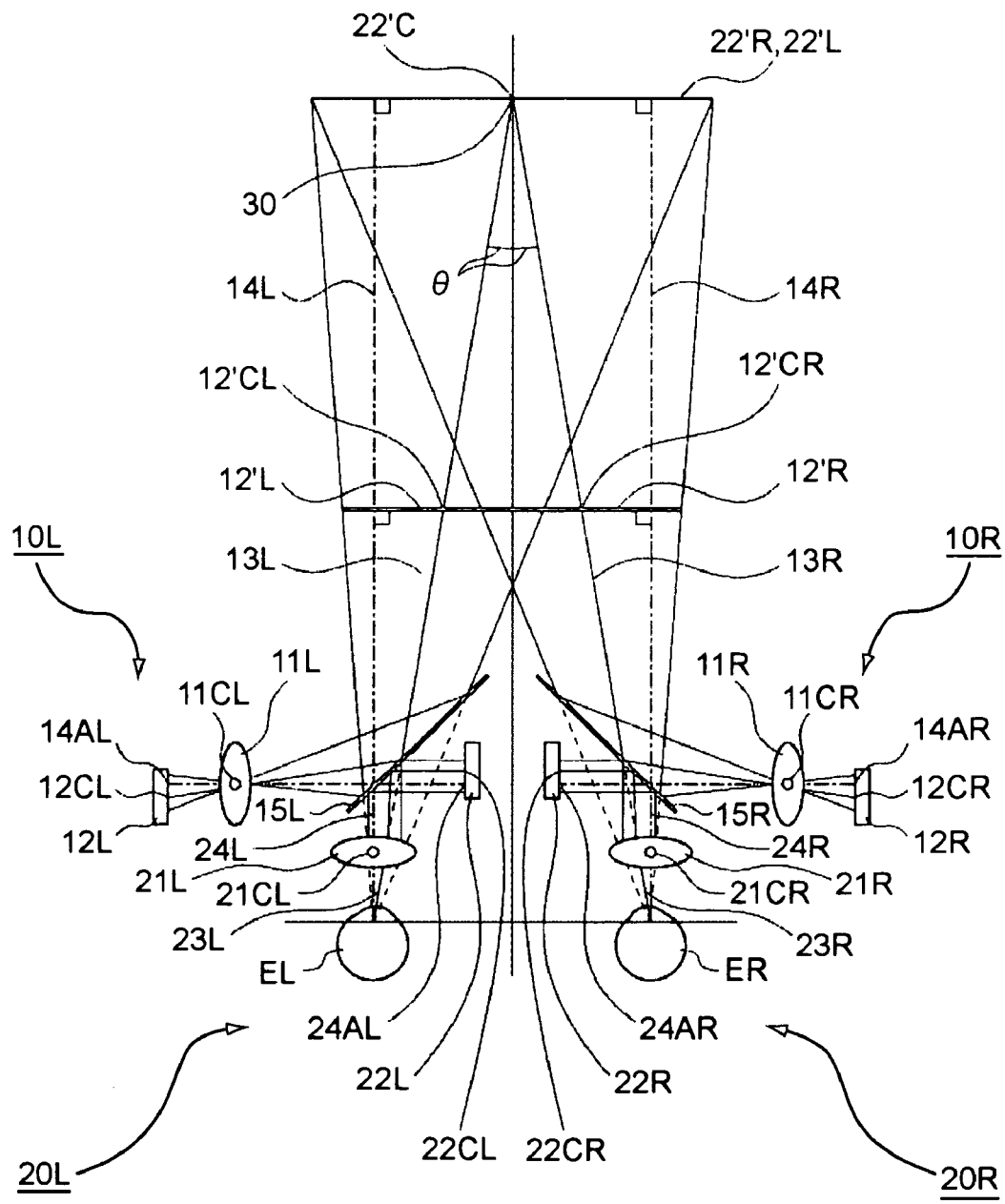
FIG. 4 is schematic view for explaining another example of the structure of an image observation system according to the present invention.

FIG. 4 is a schematic view for explaining another example of the structure of an image observation system according to the present invention. Like the example of FIG. 1, the image observation system shown in FIG. 4 is provided with a pair of image observation devices for left and right eyes, each comprising a display system 10 and an image pickup system 20.

As shown in FIG. 4, the image pickup system 10 comprises an image pickup optical system 11 and an image pickup device 12. The optical axis 13 of the image pickup system is a straight line that contains the center 11C of the entrance pupil of the image pickup optical system and a point 12'C being conjugate with the image pickup device center 12C. The optical axis 14 of the image pickup optical system is a straight line that is perpendicular to the focal plane 12' and passes the entrance pupil center 11C of the image pickup optical system.

The display system 20 comprises a display optical system 21 and a display device 22. The optical axis 23 of the display system is a straight line that contains the center 21C of the exit pupil of the display optical system and a point 22C' being conjugate with the display device center 22C. The optical axis 24 of the display optical system is a straight line that is perpendicular to a plane 22' (virtual image screen) being conjugate with the display device 22 with respect to the display optical system 21 and that passes the exit pupil center 21C of the display optical system. The position and the focal length, etc. of the display optical system 21 are determined so that an enlarged virtual image of the display device surface of the display device 22 is produced in registration, upon the plane that contains the reference position 30. The reference position 30 is set at 2 m ahead, for example.

The mirror 15 functions to separate the optical paths for the image pickup system 10 and the display system 20, from each other.

The plane 22' (virtual image screen) being conjugate with each display device 22 with respect to the display optical system 21, coincides with the plane that contains the reference position 30. The center 22C of the display device 22 is defined with a shift with respect to the point of intersection 24A between the display device 22 and the optical axis 24 of the display optical system. The amount of shift is set so that the optical axes 23L and 23R of the left-eye and right-eye display systems intersect with each other at the reference position 30. The direction of shift differs between the left-eye and right-eye display systems. Thus, the optical axes 23L and 23R of the left-eye and right-eye display systems are tilted by an angle θ, respectively, and the virtual image screens 22'L and 22'R of the left-eye and right-eye display systems 20L and 20R are registered with each other at the reference position 30. Here, the optical axes 24L and 24R of the left-eye and right-eye display optical systems are disposed in parallel to each other.

The center 12C of the image pickup device 12 is defined with a shift with respect to the point of intersection 14A between the image pickup device 12 and the optical axis 14 of the image pickup optical system. The amount of shift is set so that the optical axes 13L and 13R of the left-eye and right-eye image pickup systems intersect with each other at the reference position 30. The direction of shift differs between the left-eye and right-eye image pickup systems. Thus, the optical axes 13L and 13R of the left-eye and right-eye image pickup systems are tilted by an angle θ, respectively. Here, the optical axes 14L and 14R of the left-eye and right-eye image pickup optical systems are disposed in parallel to each other. The plane 12' (focal plane) being conjugate with the image pickup device with respect to the image pickup optical system 11, is positioned at the observer side of the reference position 30.

Figure 5:
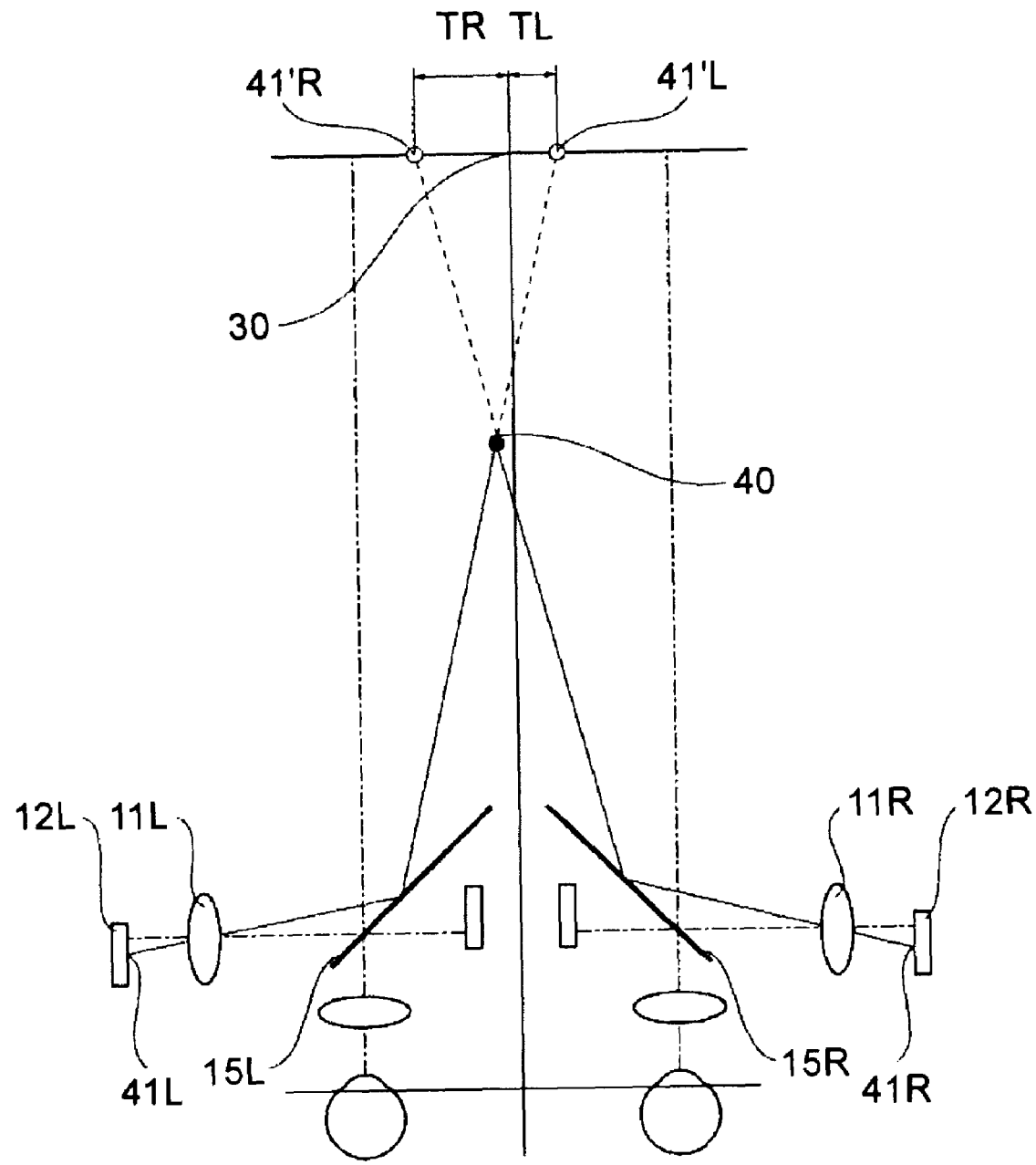
FIG. 5 is a schematic view for explaining a case wherein, in FIG. 4, an image of an object which is at a side of a reference position, facing an observer, is to be taken.
Figure 6:
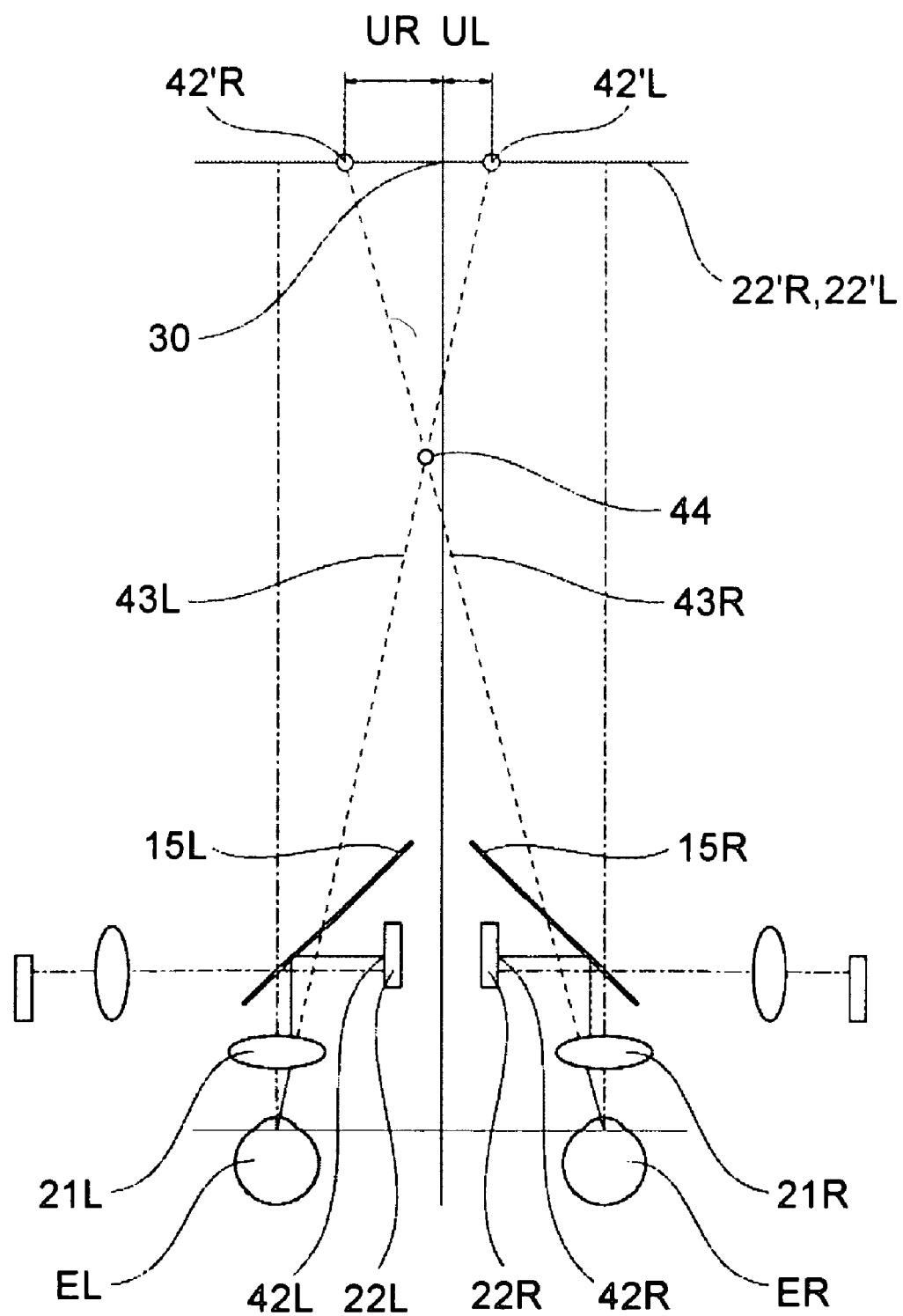
FIG. 6 is a schematic view for explaining a case wherein, in FIG. 4, an object which is at a side of the reference position, facing the observer, is to be displayed to the observer.

FIGS. 5 and 6 are schematic views, respectively, for explaining a case wherein an image of an object 40 in the outside-world space, being present at the observer side of the reference position, is to be taken and a case wherein that image is to be displayed to the observer.

In FIG. 5, the object 40 in the outside-world space is imaged as an image 41 upon the image pickup device 12, by means of the mirror 15 and the image pickup optical system 11. Here, irrespective of that the object 40 is at the observer side of the reference position 30, since the focal plane 12' of the image pickup system 10 is set at the observer side of the reference position 30 as described hereinbefore, the image 40 produced on the image pickup device 12 can be made sharp. Also, upon the plane containing the reference position 30, the image 41 corresponds to an image 41', and the image 41' is positioned at a distance T from the reference position.

In FIG. 6, the object 40 imaged by the image pickup device 10 is displayed on the display device 22 as an image 42. The image 42 can be observed by the observing eye E as an image 42' upon a virtual image screen 22' being conjugate with the display device 22. The image 42' can be observed at a position spaced by U from the virtual image screen center 30.

The observer observes the image 42'R with his/her right eye ER and observes the image 42'L with his/her left eye EL. Thus, the observer can observe as if the object 40 is present at the intersection point 44 between the line of sight 43R of the right eye ER and the line of sight 43L of the left eye EL. Here, if the image-pickup view angle and the display view angle are equal to each other, the distances T and U become equal to each other, such that the position of the intersection point 44 coincides with the actual position of the object 40 in the outside-world space. Also, the size of the object reproduced is the same as that of the object 40.

In the embodiment of FIG. 4, like the embodiment of FIG. 1, the focal plane 12' of the image pickup system 10 is set at the observer side of the reference position 30. With this arrangement, the space can be reproduced while distortion of the observed space produced when the vergence point of the image observation system is made close to the observer, can be suppressed, and a clear image can be provided to the observer even in a short-range region (the region to be observed frequently).

In the embodiments described above, the image pickup optical system may be arranged to perform autofocus in a known manner in the region at the observer side of the reference position 30. Further, to avoid complexity of the structure, a fixed focus optical system in which the focal plane 12' is fixed in a region at the observer side of the reference position 30 may be used. In that occasion, particularly, the focal plane 12' may preferably be set within 1 m range from the observer.

Further, if the distance from an entrance pupil of the image pickup optical system to the focal plane (focus plane) of the image pickup optical system is H, the size of the entrance pupil of the image pickup optical system is D, the focal length of the image pickup optical system is f, and the size of one picture element of the image pickup device is a, then the distance L from the entrance pupil of the image pickup optical system to the intersection point between the optical axes of the left and right image pickup systems may desirably satisfy the following relation:

$$L \leq [f \cdot D \cdot H] / [f \cdot D - a \cdot H]$$

If this relation is satisfied, the intersection point between the optical axes of the left and right image pickup systems comes into the depth of field of the image pickup optical system. Therefore, substantially throughout the whole observation region, a superior image can be presented to the observer.

In any case, it is desirable that the focal planes of the left-eye and right-eye image pickup optical systems are registered with each other.

It is not always necessary that the position of the virtual screen of the display system is registered with the plane that contains the intersection point between the optical axes of the left and right display systems. Particularly, if the display view angle is wide, there are cases wherein, due to the influence of aberration of field curvature of the display optical system, the diopter takes a positive value (virtual image screen position is negative). In order to avoid this, the virtual image position at the center view angle may be set at the observer side of the intersection point of the optical axes of the left and right display systems. In that occasion, to avoid conflict between vergence and adjustment during the observation, the difference in distance between the virtual image position and the intersection point of the optical axes may preferably be not greater than 0.3 diopter. Here, 1 diopter is a value represented by −1/L where L is distance (m).

Next, specific examples of the present invention will be described.

[Embodiment 1]

Figure 7:
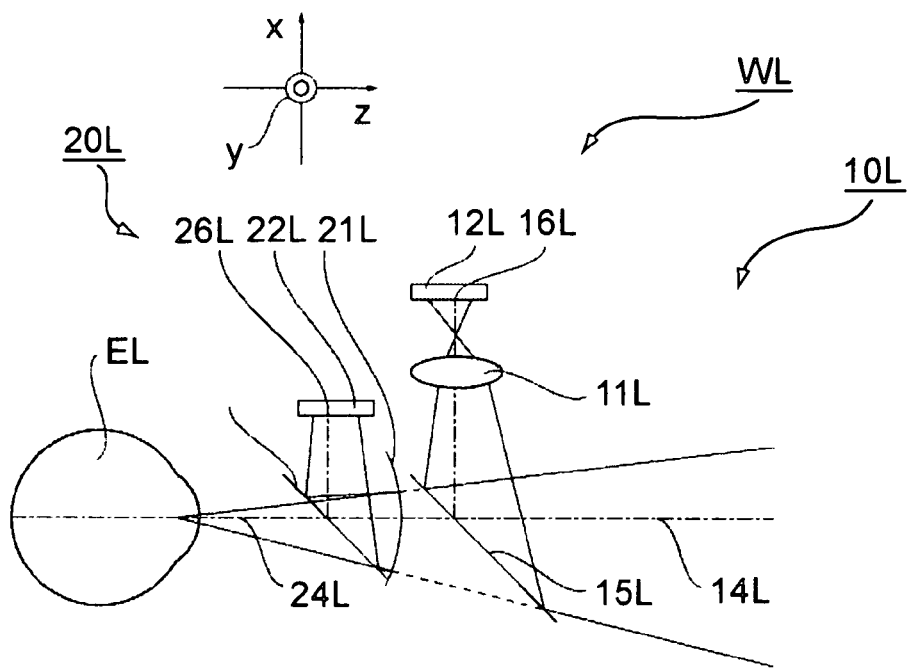
FIG. 7 is a schematic view of a main portion of an image observation system according to a first embodiment of the present invention.

FIG. 7 is a schematic view of a main portion of an image observation system according to a first embodiment of the present invention. Specifically, FIG. 7 illustrates an image observation device WL for the left eye, of the image observation system of this embodiment.

The image observation device W in this embodiment comprises a display system 20 for directing imagewise information displayed on a display device 22 to the observing eye E, and an image pickup system 10 for imaging the outside-world imagewise information upon an image pickup device 12. The imagewise information obtained through the image pickup system 10 is displayed on the display device 22 of the display system 20, for observation by the observing eyes E.

The display system 20 includes a display device 22 such as an LCD or an EL panel, for example, a half mirror 25, and a concave mirror 21 (display optical system), which are disposed along an optical axis 24 of the display optical system. The image pickup system 10 includes a mirror 15, an image pickup optical system 11 having a positive optical power, and an image pickup device 12 such as CCD, for example, disposed along the optical axis 14 of the image pickup optical system.

In this embodiment, a portion of display light as emitted from the display device that may comprise backlight, polarization plate, or transmission type liquid crystal device, for example, is reflected by the half mirror 25, and then it is reflected by the concave mirror 21 toward the observing eye E. The position and the focal length, etc. of the concave mirror 21 are determined so that an enlarged virtual image of the display device 22 is produced at 2 m ahead, for example. The exit pupil thereof is registered with the entrance pupil of the observing eye E. The center of the display device 22 is placed with a suitable amount of shift with respect to the intersection point 26 between the display device 22 and the optical axis 24 of the display optical system, to satisfy the structure shown in FIG. 4.

On the other hand, light from the outside world is reflected by the mirror 15, and it is imaged on the image pickup device 12 by means of the image pickup optical system 11. Here, the optical axis 14 of the image pickup optical system is approximately registered with the optical axis 24 of the display optical system. The center of the image pickup device 12 is placed with a suitable amount of shift with respect to the intersection point 16 between the image pickup device 12 and the optical axis 14 of the image pickup optical system, to satisfy the structure shown in FIG. 4. Further, the entrance pupil position of the image pickup optical system 11 is registered with the exit pupil position of the display optical system.

The outside-world imagewise information obtained through the image pickup system 10 is displayed on the display device 22, and it is directed to the observing eye E through the display system 20, such that the outside world can be observed as if observed through naked eyes.

Particularly, if the image pickup view angle of the outside-world image of the image pickup system 10 (it is determined by the size of the image pickup device 12 and the focal length and the positional relation of the image pickup optical system 11) is made approximately equal to the display view angle of the display system 20 (it is determined by the size of the display device 22 and the focal length and the positional relation of the concave mirror 21), the outside-world observation magnification in the video see-through observation can be registered with that of the naked-eye observation. However, similar advantageous effects are obtainable also by setting the image pickup view angle of the outside-world image of the image pickup system 10 slightly larger than the display view angle of the display system 20 and, for unit magnification observation, by cutting a portion of the produced outside-world image and displaying the same on the display device 22 of the display system 20.

Figure 8:
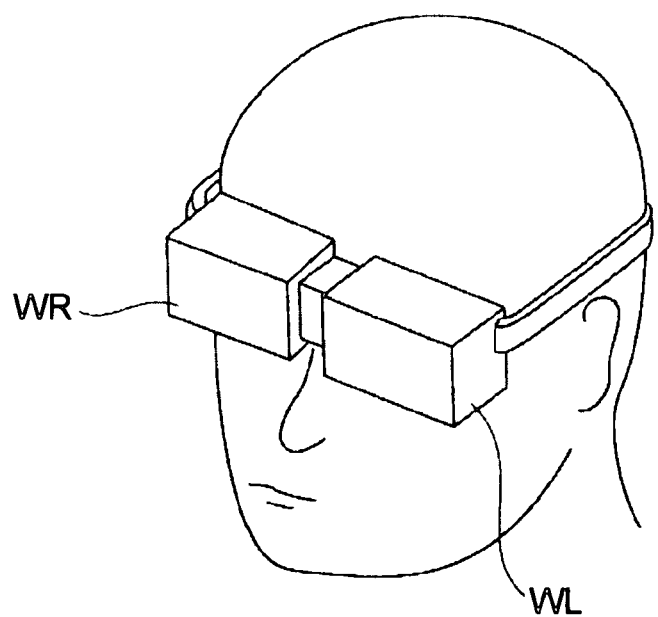
FIG. 8 is a schematic view for explaining the way of use of an image observation system of the present invention, mounted on a head.

FIG. 8 illustrates the way of use of an image observation system according to the present invention, as mounted on a head of an observer. As shown in FIG. 8, the image observation system of the present invention has an image observation device WL for the left eye and an associated image observation system WR for the right eye, which are combined in the manner as shown in FIG. 4 and are mounted on the head. Thus, for the reasons having been described with reference to FIGS. 1–6, in the short-range region (the region to be observed most frequently) a clear image can be provided to the observer, while the real space is reproduced without distortion.

[Embodiment 2]

Figure 9:
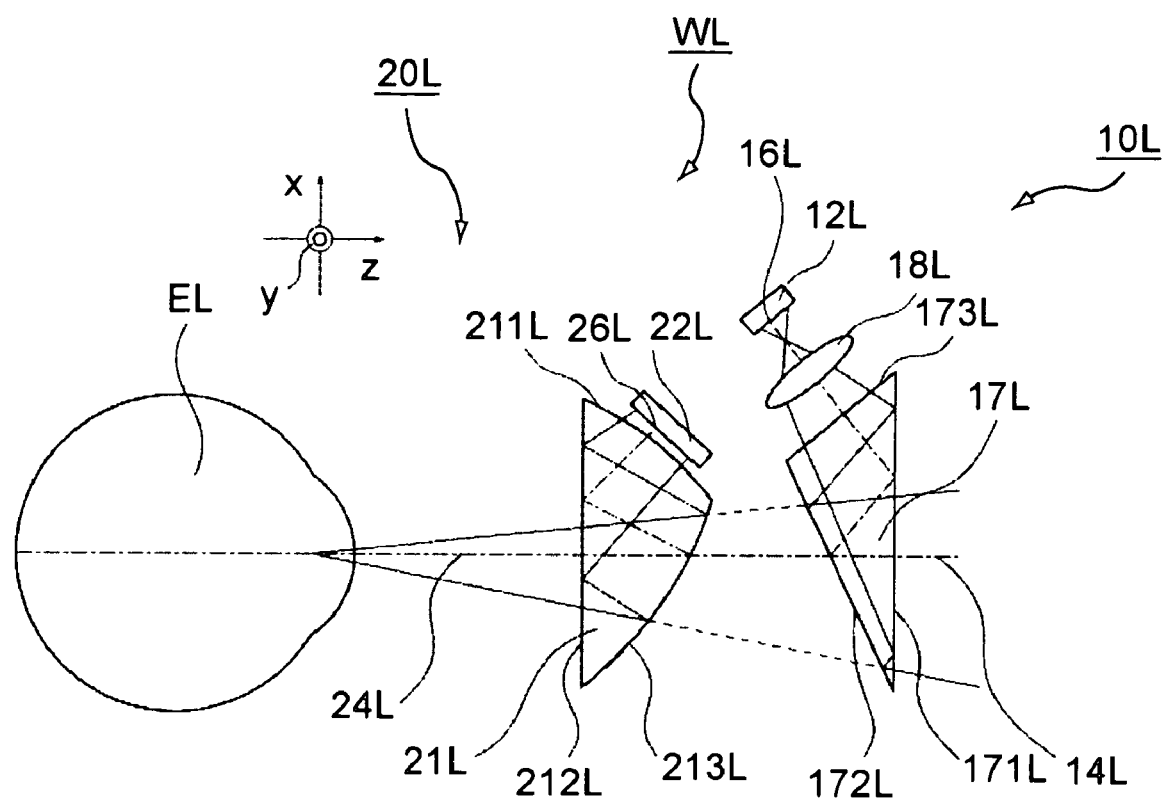
FIG. 9 is a schematic view of a main portion of another embodiment of the present invention.

FIG. 9 is a schematic view of a main portion of another embodiment of the present invention, and specifically, it illustrates a left-eye image observation device WL of the image observation system of this embodiment.

The display system 20 includes a display device such as an LCD or an EL panel, and a display optical system comprising a prism element. The image pickup system 10 comprises a prism 17 formed with flat surfaces, an imaging optical system 18 having a positive optical power, and an image pickup device 16 such as a CCD, for example.

In this embodiment, display light emitted from the display device 22 that may comprise backlight, polarization plate, or transmission type liquid crystal device, for example, enters the prism element 21 while being refracted by the surface 211, and it is incident on the surface 212 at an incidence angle not less than the critical angle, whereby it is totally reflected. Then the light is reflected by the mirror surface 213, and again it impinges on the surface 212 at an incidence angle not greater than the critical angle. After being refracted thereby, the light goes out of the prism member 21 and is directed to the observing eye E. The prism member 21 is formed with an eccentric and non-rotationally symmetrical surface having an optical power different in accordance with the azimuth angle, this being for better correction of aberration resulting from tilted placement of the surface having an optical power. This is effective to reduce the size of the display optical system. The position and the focal length, etc. of the prism member 21 are determined so that a magnified virtual image of the display device 22 is produced at 2 m ahead. The exit pupil thereof is registered with the entrance pupil of the observing eye E.

On the other hand, light from the outside world enters the prism 17 while being refracted by the surface 171, and it is reflected by the mirror surface 172. Then, the light is incident on the surface 171 at an incidence angle not less than the critical angle, and it is totally reflected thereby. Then, the light impinges on the surface 172 at an incidence angle not greater than the critical angle. After being refracted thereby, the light goes out of the prism 17. Then, the light is imaged on the image pickup device 12 by an imaging optical system 18. The optical axis of the image pickup system 10 is approximately registered with the optical axis 24 of the display system 20. Also, the entrance pupil position of the image pickup optical system is registered with the exit pupil position of the display optical system.

The center of the display device 22 is placed with a shift with respect to the point of intersection 26 between the display device 22 and the optical axis 24, while the center of the image pickup device 12 is placed with a shift with respect to the point of intersection 16 between the image pickup device 12 and the optical axis 14, each being of an amount shown in FIG. 4.

The outside-world imagewise information obtained by the image pickup system 10 is displayed on the display device 22, and it is directed to the observing eye E by the display system 20, such that the outside world can be observed as if observed through naked eyes.

With this arrangement, for the reasons having been described with reference to FIGS. 1–6, in the short-range region (the region to be observed most frequently) a clear image can be provided to the observer, while the real space is reproduced without distortion.

Figure 10:
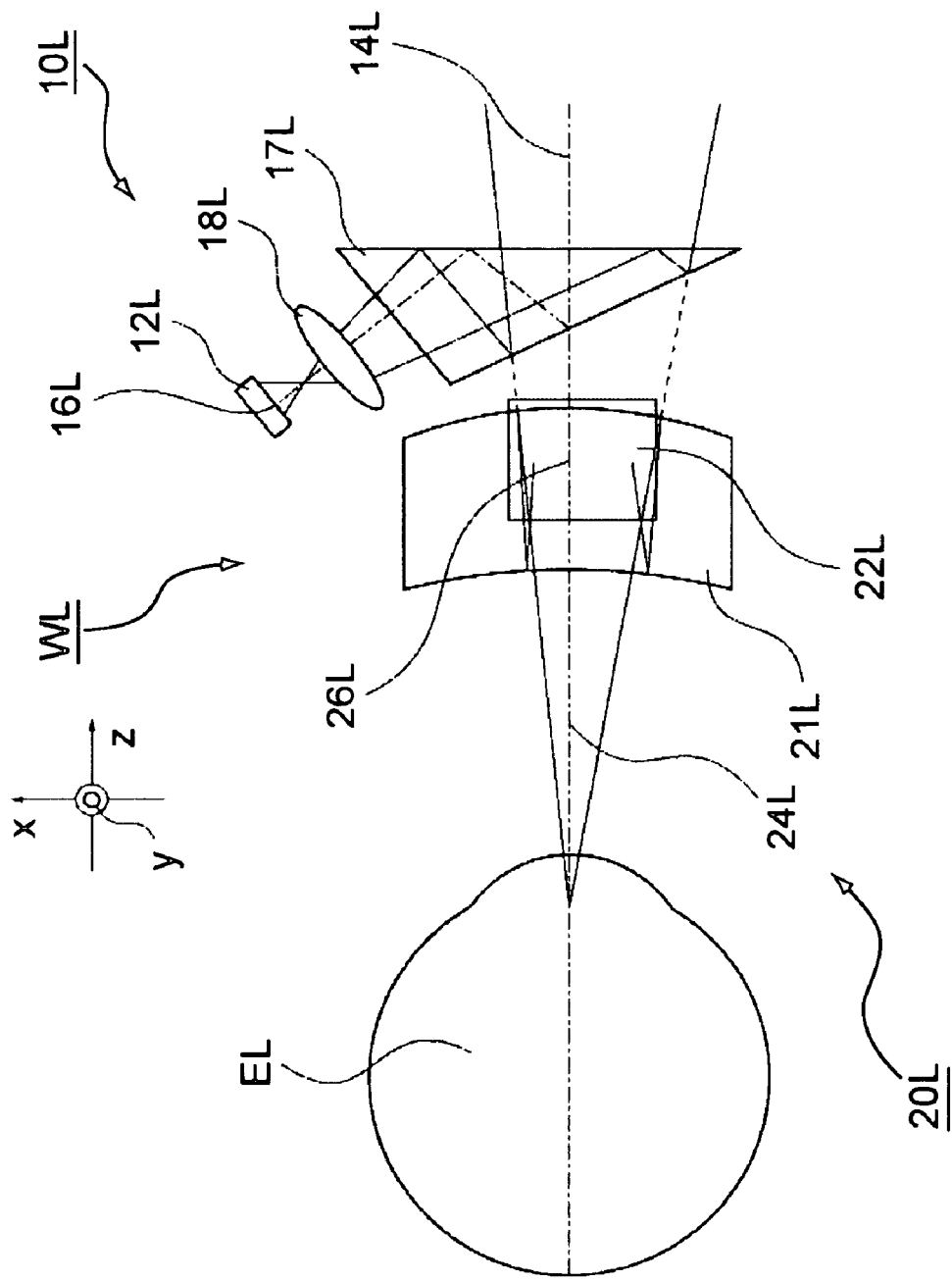
FIG. 10 is a schematic view of a main portion of a further embodiment of the present invention.

FIG. 10 is a schematic view of a main portion of a further embodiment of the present invention, and specifically, it illustrates a left-eye image observation device WL of an image observation system of this embodiment.

In FIG. 10, the bending (deflecting) direction of the optical axis of the display system 20 is set differently from the bending (deflecting) direction of the optical axis of the image pickup system 10. This is effective to reduce the size of the whole structure. In FIG. 10, the display system 20 and the image pickup system 10 have the same functions as those shown in FIG. 9. The center of the display device 22 is placed with a shift with respect to the point of intersection 26 between the display device 22 and the optical axis 24, while the center of the image pickup device 12 is placed with a shift with respect to the point of intersection 16 between the image pickup device 12 and the optical axis 14, each being of an amount shown in FIG. 4.

[Embodiment 3]

Figure 11:
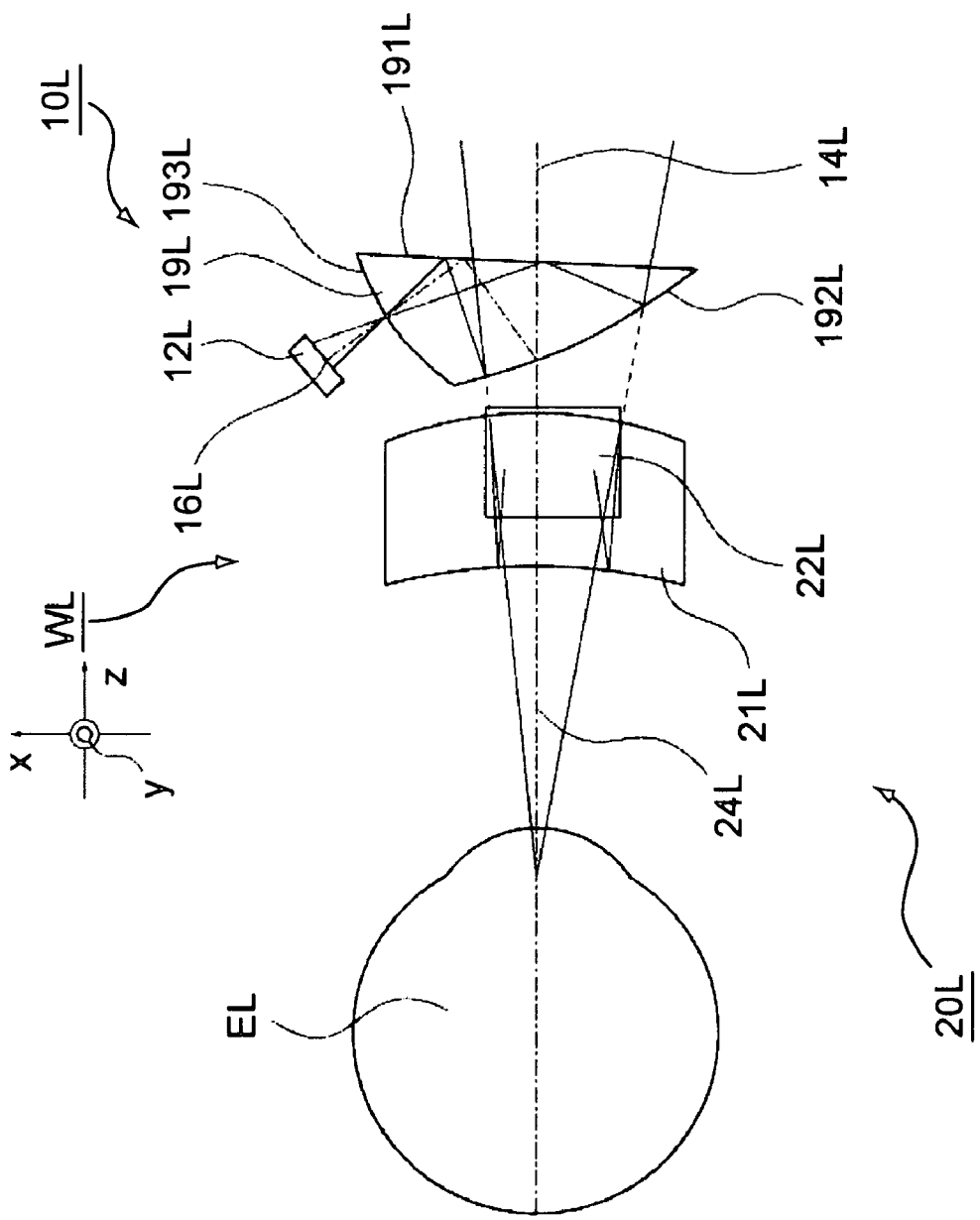
FIG. 11 is a schematic view of a main portion of a still further embodiment of the present invention.

FIG. 11 is a schematic view of a main portion of another embodiment of the present invention, and specifically it illustrates a left-eye image observation device WL of an image observation system of this embodiment. This embodiment differs from the embodiment shown in FIG. 10, in the structure of the image pickup system 10.

In FIG. 11, the display system 20 has the same function as that of the embodiment shown in FIG. 10. Light from the outside world is refracted by the surface 191, and it enters the prism member 19. The light is reflected by the mirror surface 192, and again it impinges on the surface 191 at an incidence angle not less than the critical angle, whereby it is totally reflected. Then, the light impinges on the surface 193 at an incidence angle not greater than the critical angle. After being refracted thereby, the light goes out of the prism member 19. Then, the light is imaged on the image pickup device 12.

On the other hand, regarding the image pickup device 10, the prism member 19 is formed with an eccentric and non-rotationally symmetrical surface having an optical power different in accordance with the azimuth angle, this being for better correction of aberration resulting from tilted placement of the surface having an optical power, with respect to the optical axis. This is effective to reduce the size of the display optical system 10, while keeping good optical characteristics.

The center of the image pickup device 12 is placed with a shift with respect to the point of intersection 16 between the image pickup device 12 and the optical axis 14, of an amount shown in FIG. 4.

[Embodiment 4]

Figure 12:
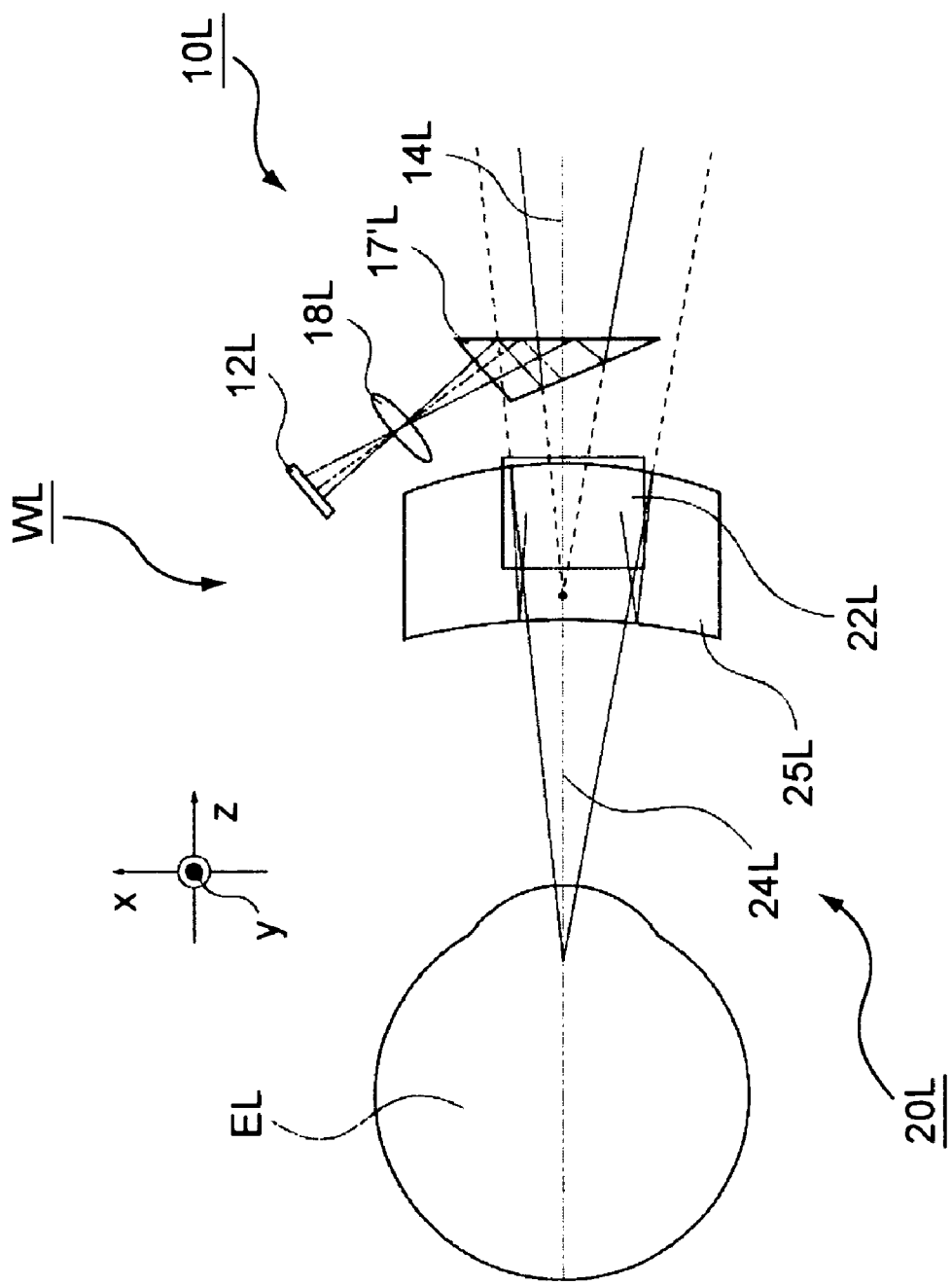
FIG. 12 is a schematic view of a main portion of a yet further embodiment of the present invention.

FIG. 12 is a schematic view of a main portion of another embodiment of the present invention, and specifically it illustrates a left-eye image observation device WL of an image observation system of this embodiment. This embodiment differs from the embodiment shown in FIG. 10, in the structure of the image pickup system 10.

In the embodiment shown in FIG. 12, the entrance pupil position of an image pickup optical system, comprising a prism 17' and an imaging optical system 18, is shifted toward the outside-world side, with respect to the exit pupil position of the display optical system, by which reduction in size of the structure is assured. Also, by setting the entrance pupil position with a deviation with respect to the exit pupil position of the display optical system by a predetermined amount, as described above, the space reproduced by the display system can be presented to the observer in a larger scale than the case of naked-eye observation. Consequently, it is possible to avoid such eye-hole effect that, when a space is reproduced in a limited visual field, the reproduced space is recognized small despite that it is reproduced substantially with the same size. Generally, the amount of shift of the entrance pupil position of the image pickup optical system with respect to the exit pupil position of the display optical system is, preferably, not less than 5 mm and not greater than 60 mm.

Even with this arrangement, for the reasons having been described with reference to FIGS. 1–6, in the short-range region (the region to be observed most frequently) a clear image can be provided to the observer, while the real space is reproduced without distortion.

FIGS. 13A and 13B illustrate notions regarding the display content to be displayed by the image observation system of the present invention.

In the embodiments described hereinbefore, regarding the image to be displayed on the display device 22, the outside-world imagewise information obtained by the image pickup device 10 may be displayed directly as shown in FIG. 13A. However, in addition to this, as shown in FIG. 13B, the outside-world imagewise information obtained by the image pickup system 10 is combined by image synthesizing means 61 with imagewise information generated by separate image creating means 60 (for example, an image created by computer graphics or a video image recorded by a video camera or the like), such that a combined image is displayed on the display device 22.

Further, the embodiments shown in FIGS. 7–12 have been explained with reference to examples wherein the display device and the image pickup device are disposed with a deviation with respect to their optical axes (as described with reference to FIG. 4). However, it is a possible alternative that, as shown in FIG. 1, the center of the image pickup device is placed on the optical axis of the image pickup optical system while the center of the display device is placed on the optical axis of the display optical system, and the image pickup system and the display system as a whole are tilted by an angle θ to tilt the optical axes of the left-eye and right-eye image pickup systems and display systems by an angle θ, such that these optical axes intersect with each other at the reference position defined at the outside-world side.

Further, in the embodiments described hereinbefore, the display device comprises a transmission type liquid crystal device. However, a reflection type liquid crystal device or a light self-emission type device such as EL, may be used. Also, although a CCD is used as an image pickup device, a device such as a CMOS sensor, for example, may be used.

While the invention has been described with reference to the structures disclosed herein, it is not confined to the details set forth and this application is intended to cover such modifications or changes as may come within the purposes of the improvements or the scope of the following claims.

What is claimed is:

1. An image observation system, comprising:
  a pair of image observation devices each having i) an image pickup device, ii) an image pickup optical system for directing light rays from an outside world to said image pickup device, iii) a display device for displaying an outside world image obtained by said image pickup system, and iv) a display optical system for directing light from said display device to an observing eye,
  wherein, where an axis containing a center of an entrance pupil of said image pickup optical system and a point being conjugate with a center of said image pickup device with respect to said image pickup optical system is taken as an optical axis of an image pickup system while an axis containing a center of an exit pupil of said display optical system and a point being conjugate with a center of said display device with respect to said display optical system is taken as an optical axis of a display system, the optical axis of the image pickup system and the optical axis of the display system optical axis are disposed coaxially,
  wherein the optical axes of the image pickup systems of the pair of image observation devices define a point of intersection, wherein a focal plane being at a position conjugate with a surface of said image pickup device with respect to said image pickup optical system is disposed at a side of the intersection point of the optical axes of the image pickup systems, which side faces an observer, and wherein, when the distance from an entrance pupil of said image pickup optical system to a focal plane of said image pickup optical system is H, the size of the entrance pupil of said image pickup optical system is D, the focal length of said image pickup optical system is f, and the size of one picture element of said image pickup device is a, the distance L from the entrance pupil of said image pickup optical system to the intersection point satisfies the following relation:

$L \leq [f \cdot D \cdot H]/[f \cdot D - a \cdot H]$.

2. An image observation system according to claim 1, wherein the focal plane of said image pickup optical system is fixed at a predetermined position.

3. An image observation system according to claim 1, wherein the focal plane of said image pickup optical system is set at a distance not greater than 1 m from the observer's position.

4. An image observation system according to claim 1, wherein a virtual image position of a center view angle of each display system, corresponding to a position conjugate with said center of the display device in the pair of image observation devices, with respect to said display optical system, is approximately coincident with the intersection point of the optical axes of said image pickup systems.

5. An image observation system according to claim 1, wherein a virtual image position of a center view angle of each display system, corresponding to a position conjugate with the center of said display device in the pair of image observation devices, with respect to said display optical system, is at a side of the intersection point of the optical axes of said image pickup systems, which side faces the observer.

6. An image observation system according to claim 5, wherein the distance between the virtual image position of the center view angle of said display system and the intersection point of the optical axes of said image pickup systems is not greater than 0.3 diopter.

7. An image observation system according to claim 1, wherein said image pickup optical system has an imaging view angle being approximately equal to a display view angle of said display optical system.

8. An image observation system, comprising:

a pair of image observation devices each having i) an image pickup device, ii) an image pickup optical system for directing light rays from an outside world to said image pickup device, iii) a display device for displaying an outside world image obtained by said image pickup system, and iv) a display optical system for directing light from said display device to an observing eye, wherein, where an axis containing a center of an entrance pupil of said image pickup optical system and a point being conjugate with a center of said image pickup device with respect to said image pickup optical system is taken as an optical axis of an image pickup system while an axis containing a center of an exit pupil of said display optical system and a point being conjugate with a center of said display device with respect to said display optical system is taken as an optical axis of a display system, the optical axis of the image pickup system and the optical axis of the display system optical axis are disposed coaxially, wherein the optical axes of the image pickup systems of the pair of image observation devices define a point of intersection, wherein a focal plane being at a position conjugate with a surface of said image pickup device with respect to said image pickup optical system is disposed at a side of the intersection point of the optical axes of the image pickup systems, which side faces an observer, and wherein, when a straight line perpendicular to the focal plane of said image pickup optical system and passing through the center of the entrance pupil of said image pickup optical system is taken as an optical axis of said image pickup optical system while a straight line perpendicular to the virtual image plane and passing through the center of the exit pupil of said display optical system is taken as an optical axis of said display optical system, the optical axis of one image pickup optical system of the pair of image pickup systems, which one is at the outside world side, and the optical axis of one display optical system of the pair of display systems, which one is at the eye ball side, are parallel to each other and are spaced by an even interval, and wherein the centers of the pair of image pickup devices are disposed with a shift of a predetermined distance, with respect to the optical axes of the respective image pickup optical systems, while the centers of the pair of display devices are disposed with a shift by a predetermined distance, with respect to the optical axes of the respective display optical systems, whereby the point of intersection of the optical axes of the pair of image pickup systems is defined.

9. An image observation system according to claim 1, wherein said image pickup optical system includes i) a prism with plural planes having a transmission function and a total reflection function, and ii) an optical element disposed in a portion of an optical path between said prism and said image pickup device and having a positive optical power.

10. An image observation system according to claim 1, wherein said image pickup optical system has an eccentric and non-rotationally symmetric reflection surface having an optical power being different in accordance with an azimuth angle.

11. An image observation system according to claim 1, wherein said display optical system has an eccentric and non-rotationally symmetric reflection surface having an optical power being different in accordance with an azimuth angle.

12. An image observation system according to claim 1, further comprising image creating means for producing an image and image synthesizing means for combining an image from said image creating means and an image from said image pickup system so that a combined image is displayed upon said display device.

13. An image observation system according to claim 1, wherein the entrance pupil position of said image pickup optical system is disposed with a shift, toward the outside world, from the exit pupil position of said display optical system.

14. An image observation system according to claim 13, wherein therein the amount of shift of the entrance pupil position of said image pickup optical system with respect to the exit pupil position of said display optical system is not greater than 60 mm.

15. An image observation system according to claim 8, wherein the focal plane of said image pickup optical system is fixed at a predetermined position.

16. An image observation system according to claim 8, wherein the focal plane of said image pickup optical system is set at a distance not greater than 1 m from the observer's position.

17. An image observation system according to claim 8, wherein a virtual image position of a center view angle of each display system, corresponding to a position conjugate with the center of said display device in said pair of image observation devices, with respect to said display optical system, is approximately coincident with the intersection point of the optical axes of said image pickup systems.

18. An image observation system according to claim 8, wherein a virtual image position of a center view angle of each display system, corresponding to a position conjugate with the center of said display device in the pair of image observation devices, with respect to said display optical system, is at a side of the intersection point of the optical of said image pickup systems, which side faces the observer.

19. An image observation system according to claim 17, wherein the distance between the virtual image position of the center view angle of said display system and the intersection point of the optical axes of said image pickup systems is not greater than 0.3 diopter.

20. An image observation system according to claim 8, wherein said image pickup optical system has an imaging view angle being approximately equal to a display view angle of said display optical system.

21. An image observation system according to claim 8, wherein said image pickup optical system includes i) a prism with plural planes having a transmission function and a total reflection function, and ii) an optical element disposed in a portion of an optical path between said prism and said image pickup device and having a positive optical power.

22. An image observation system according to claim 8, wherein said image pickup optical system has an eccentric and non-rotationally symmetric reflection surface having an optical power being different in accordance with an azimuth angle.

23. An image observation system according to claim 8, wherein said display optical system has an eccentric and non-rotationally symmetric reflection surface having an optical power being different in accordance with an azimuth angle.

24. An image observation system according to claim 8, further comprising image creating means for producing an image and image synthesizing means for combining an image from said image creating means and an image from said image pickup system so that a combined image is displayed upon said display device.

25. An image observation system according to claim 8, wherein the entrance pupil position of said image pickup optical system is disposed with a shift, toward the outside world, from the exit pupil position of said display optical system.

26. An image observation system according to claim 25, wherein therein the amount of shift of the entrance pupil position of said image pickup optical system with respect to the exit pupil position of said display optical system is not greater than 60 mm.

* * * * *

UNITED STATES PATENT AND TRADEMARK OFFICE
CERTIFICATE OF CORRECTION

| | | |
|---|---|---|
| PATENT NO. | : 7,193,585 B2 | Page 1 of 1 |
| APPLICATION NO. | : 10/722444 | |
| DATED | : March 20, 2007 | |
| INVENTOR(S) | : Akinari Takagi | |

It is certified that error appears in the above-identified patent and that said Letters Patent is hereby corrected as shown below:

COLUMN 1:

Line 51, "eye-ball" should read --eyeball--.
   Line 66, "eye-ball" should read --eyeball--.

COLUMN 2:

Line 36, "eye balls" should read --eyeballs--.

COLUMN 12:

Line 26, "θto" should read --θ to--.

COLUMN 14:

Line 23, "eye ball" should read --eyeball--.
   Line 64, "therein" should be deleted.

COLUMN 16:

Line 27, "therein" should be deleted.

Signed and Sealed this

Eleventh Day of November, 2008

JON W. DUDAS
*Director of the United States Patent and Trademark Office*